United States Patent
Bolan et al.

(10) Patent No.: US 9,958,923 B2
(45) Date of Patent: May 1, 2018

(54) PREVENTING OVERSUBSCRIPTION TO POWER RESOURCES IN A COMPUTING SYSTEM

(71) Applicant: LENOVO ENTERPRISE SOLUTIONS (SINGAPORE) PTE. LTD., Singapore (SG)

(72) Inventors: Joseph E. Bolan, Cary, NC (US); Vijay Kumar, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 322 days.

(21) Appl. No.: 14/310,090

(22) Filed: Jun. 20, 2014

(65) Prior Publication Data

US 2015/0370301 A1    Dec. 24, 2015

(51) Int. Cl.
*G06F 1/30* (2006.01)
*G06F 1/26* (2006.01)

(52) U.S. Cl.
CPC .............. *G06F 1/30* (2013.01); *G06F 1/263* (2013.01)

(58) Field of Classification Search
CPC ...... G06F 1/324; G06F 1/3234; G06F 1/3296; G06F 1/3243; G06F 1/3203; G06F 1/3206
See application file for complete search history.

(56) References Cited

U.S. PATENT DOCUMENTS

| | | | |
|---|---|---|---|
| 5,652,893 A * | 7/1997 | Ben-Meir | G06F 1/3215 713/300 |
| 7,043,647 B2 | 5/2006 | Hansen et al. | |
| 7,124,321 B2 | 10/2006 | Garnett et al. | |
| 7,254,016 B1 * | 8/2007 | Strickland | G06F 1/3203 361/679.31 |
| 7,457,976 B2 | 11/2008 | Bolan et al. | |
| 7,493,503 B2 | 2/2009 | Aldereguia et al. | |
| 7,512,824 B2 | 3/2009 | Artman et al. | |
| 7,519,843 B1 | 4/2009 | Buterbaugh et al. | |

(Continued)

FOREIGN PATENT DOCUMENTS

| WO | WO 2012/175144 A1 | 12/2012 |
|---|---|---|
| WO | WO 2013/101009 A1 | 7/2013 |

OTHER PUBLICATIONS

IBM, "Method to allow power redundant system to survive power supply loss using fast throttling", IP.com Prior Art Database Technical Disclosure, IP.com (online publication), pp. 1-3, Jun. 2008, IP No. IPCOM000171724D.

(Continued)

*Primary Examiner* — Thomas Lee
*Assistant Examiner* — Gary Collins
(74) *Attorney, Agent, or Firm* — Brandon C. Kennedy; Jason A. Friday; Kennedy Lenart Spraggins LLP

(57) ABSTRACT

Preventing oversubscription to power resources in a computing system that includes a plurality of power supplies configured to deliver power to a plurality of integrated technology elements ('ITEs'), including: detecting, by a power management module, that power delivery capabilities of the power supplies have changed; determining, by the power management module in dependence upon a power redundancy policy and the power delivery capabilities of the power supplies, power settings for the plurality of ITEs; and updating, by the power management module, power settings for the plurality of ITEs.

20 Claims, 4 Drawing Sheets

(56) References Cited

U.S. PATENT DOCUMENTS

| | | | |
|---|---|---|---|
| 7,730,365 B1* | 6/2010 | Belady | G06F 9/5011 714/47.1 |
| 7,814,349 B2 | 10/2010 | Merkin et al. | |
| 7,861,103 B2 | 12/2010 | Buterbaugh et al. | |
| 8,527,795 B2 | 9/2013 | Howard et al. | |
| 2002/0066045 A1* | 5/2002 | Layton | G06F 1/26 713/300 |
| 2003/0056125 A1* | 3/2003 | O'Conner | G06F 1/26 713/300 |
| 2004/0158771 A1* | 8/2004 | Garnett | G06F 1/263 714/14 |
| 2005/0172157 A1* | 8/2005 | Artman | G06F 1/30 713/300 |
| 2007/0118771 A1* | 5/2007 | Bolan | G06F 1/263 713/300 |
| 2007/0150757 A1* | 6/2007 | Aldereguia | G06F 1/3209 713/300 |
| 2007/0216229 A1* | 9/2007 | Johnson, Jr. | G06F 1/30 307/86 |
| 2008/0320322 A1* | 12/2008 | Green | G06F 1/26 713/340 |
| 2009/0307514 A1* | 12/2009 | Roberts | G06F 1/26 713/330 |
| 2010/0064150 A1* | 3/2010 | Higuchi | G06F 1/30 713/300 |
| 2010/0102790 A1* | 4/2010 | Buterbaugh | H02M 3/1584 323/283 |
| 2010/0318826 A1* | 12/2010 | Hansen | G06F 1/20 713/323 |
| 2011/0025129 A1* | 2/2011 | Humphrey | G06F 1/263 307/64 |
| 2011/0029793 A1* | 2/2011 | Horvath | G06F 1/3203 713/320 |
| 2012/0226923 A1* | 9/2012 | Ikabata | G06F 11/3034 713/320 |
| 2012/0331317 A1* | 12/2012 | Rogers | G06F 1/28 713/320 |
| 2013/0013759 A1* | 1/2013 | Austen | G06F 15/161 709/223 |
| 2013/0013942 A1* | 1/2013 | Koshimizu | G06F 1/3206 713/320 |
| 2013/0339776 A1* | 12/2013 | Jagadishprasad | G06F 9/5094 713/340 |
| 2014/0310539 A1* | 10/2014 | Messick | G06F 1/263 713/320 |
| 2015/0177813 A1* | 6/2015 | Bailey | G06F 1/3234 713/320 |
| 2015/0261272 A1* | 9/2015 | Munjal | G06F 1/263 713/300 |

OTHER PUBLICATIONS

IBM, "BladeCenter web interface: detailed power domain information", IBM.com (online publication), Accessed: Jan. 27, 2014, 4 Pages, URL: http://publib.boulder.ibm.com/infocenter/bladectr/documentation/index.jsp?topic=/com.ibm.bladecenter.advmgtmod.doc/kp1bb_bc_mmug_ammpowerdetail.html.

* cited by examiner

PREVENTING OVERSUBSCRIPTION TO POWER RESOURCES IN A COMPUTING SYSTEM

BACKGROUND OF THE INVENTION

Field of the Invention

The field of the invention is data processing, or, more specifically, methods, apparatus, and products for preventing oversubscription to power resources in a computing system.

Description of Related Art

Modern computing systems may be embodied as blade centers that include a plurality of blade servers. In many systems, blade components are powered from a shared power domain. When a power domain is powered by several power supplies, more than one power supply can fail at a time and cause an oversubscription to power resources, where blade components demand more power than can be delivered by the functioning power supplies. In such situations, a total system shutdown and an associated host of problems may be experienced.

SUMMARY OF THE INVENTION

Methods, apparatuses, and products for preventing oversubscription to power resources in a computing system that includes a plurality of power supplies configured to deliver power to a plurality of integrated technology elements ('ITEs'), including: detecting, by a power management module, that power delivery capabilities of the power supplies have changed; determining, by the power management module in dependence upon a power redundancy policy and the power delivery capabilities of the power supplies, power settings for the plurality of ITEs; and updating, by the power management module, power settings for the plurality of ITEs.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Example methods, apparatuses, and products for preventing oversubscription to power resources in a computing system in accordance with the present invention are described with reference to the accompanying drawings, beginning with FIG. 1.

Figure 1:
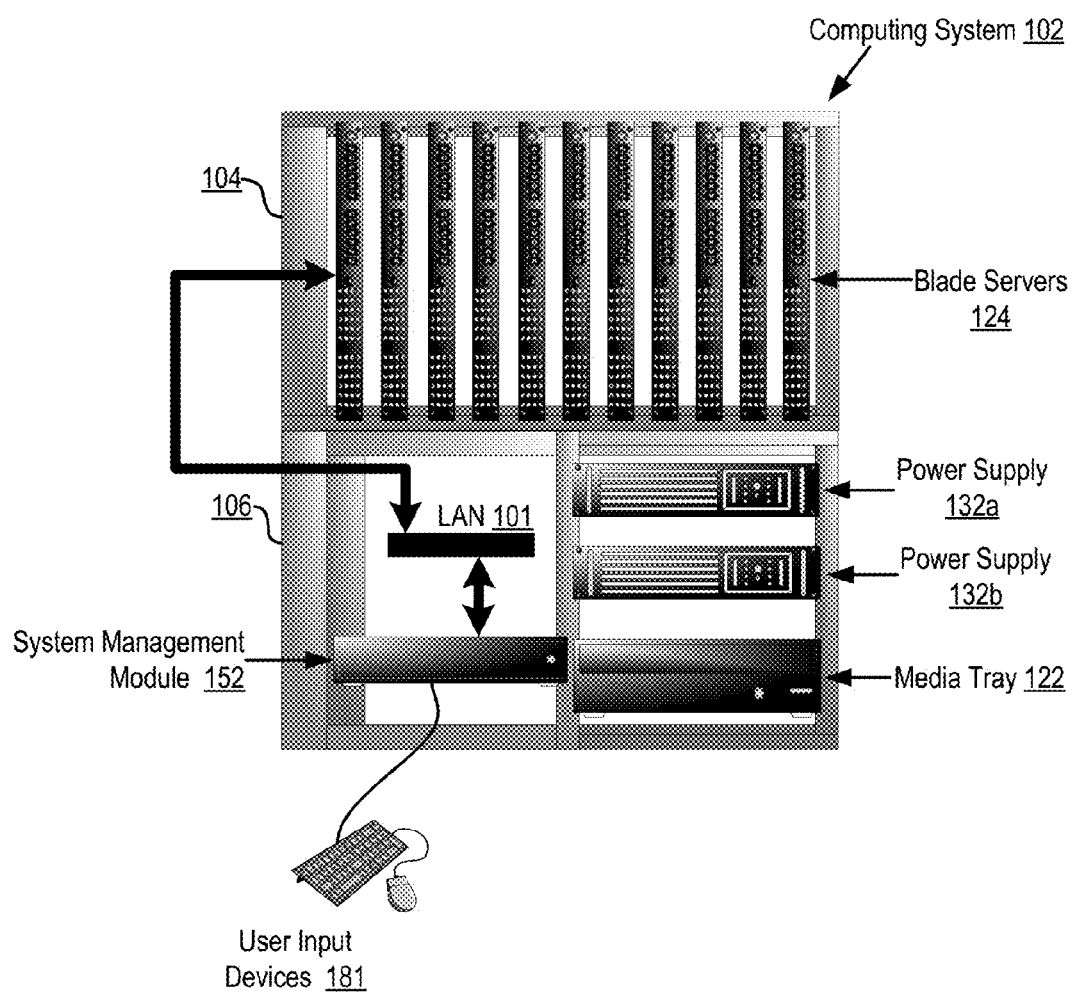
FIG. 1 sets forth a diagram of an example computing system in which oversubscription to power resources may be prevented according to embodiments of the present invention.

FIG. 1 sets forth a diagram of an example computing system (102) in which oversubscription to power resources may be prevented according to embodiments of the present invention. The computing system (102) of FIG. 1 includes a plurality of integrated technology elements ('ITEs') that can receive power from a plurality of power supplies (132a, 132b). Each ITE represents a computing component such as a storage device, a blower, a blade server (124), or other power consuming computing component of the computing system (102).

The ITEs depicted in FIG. 1 can receive power from a plurality of power supplies (132a, 132b). Each power supply (132a, 132b) in FIG. 1 is a device that supplies electric power to an electrical load. Each power supply (132a, 132b) may be embodied, for example, as a switched mode power supply that transfers power from a source such as mains power to a load such as the ITEs, while converting voltage and current characteristics.

The computing system (102) of FIG. 1 is depicted as a chassis environment. A 'chassis environment,' as the term is used in this specification, refers generally to a blade server system. The blade server system in the example depicted in FIG. 1 is installed in a two-bay chassis (104, 106) and includes one or more of blade servers (124), one or more system management modules (152), one or more media trays (122), and one or more power supplies (132a, 132b). The computing system (102) of FIG. 1 therefore includes a plurality of ITEs, illustrated in this example as blade servers (124), the system management module (152), and the media tray (122), although readers will appreciate that in other embodiments additional ITEs may be included in the computing system (102), where each additional ITE can be embodied as any power consuming computing component of the chassis environment.

The system management module (152) of FIG. 1 may be embodied as a computer, including software and hardware components, one or more computer processors and computer memory, that provides system management functions for components in the example chassis environment, including the blade servers (124) and the media tray (122). The system management module (152) of FIG. 1 may also make available connections for user input devices such as mice or keyboards (181) that are not generally connected directly to the blade servers (124) or to the chassis itself.

The computing system (102) of FIG. 1 also includes one or more blade servers (124). The one or more blade servers (124) of FIG. 1 are installed in cabinet bay (104) of the example computing system (102). Such blade servers (124) are computing devices implemented in blade form factor. The blade servers (124) may share access to the media tray (122) and may be connected to one another and to the system management module (152) for data communications through a local area network ('LAN') (101), which may be embodied as a small network installed within the computing system (102).

The computing system (102) of FIG. 1 also includes one or more media trays (122). The one or more media trays (122) in FIG. 1 may house non-volatile memory media generally. A media tray (122) may typically include Compact Disc read-only media drives ('CD-ROM'), Digital Video Disc ROM drives (DVD-ROM), CD-RW drives, DVD-RW drives, floppy disk drives, and so on as will occur to those of skill in the art.

The arrangement of the chassis environment, network (101), and other devices making up the example computing system (102) illustrated in FIG. 1 are for explanation, not for limitation. Computing systems useful according to various embodiments of the present invention may include additional servers, routers, and other devices, not shown in FIG. 1, as will occur to those of skill in the art. Networks in such data processing systems may support many data communications protocols, including Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Figure 2:
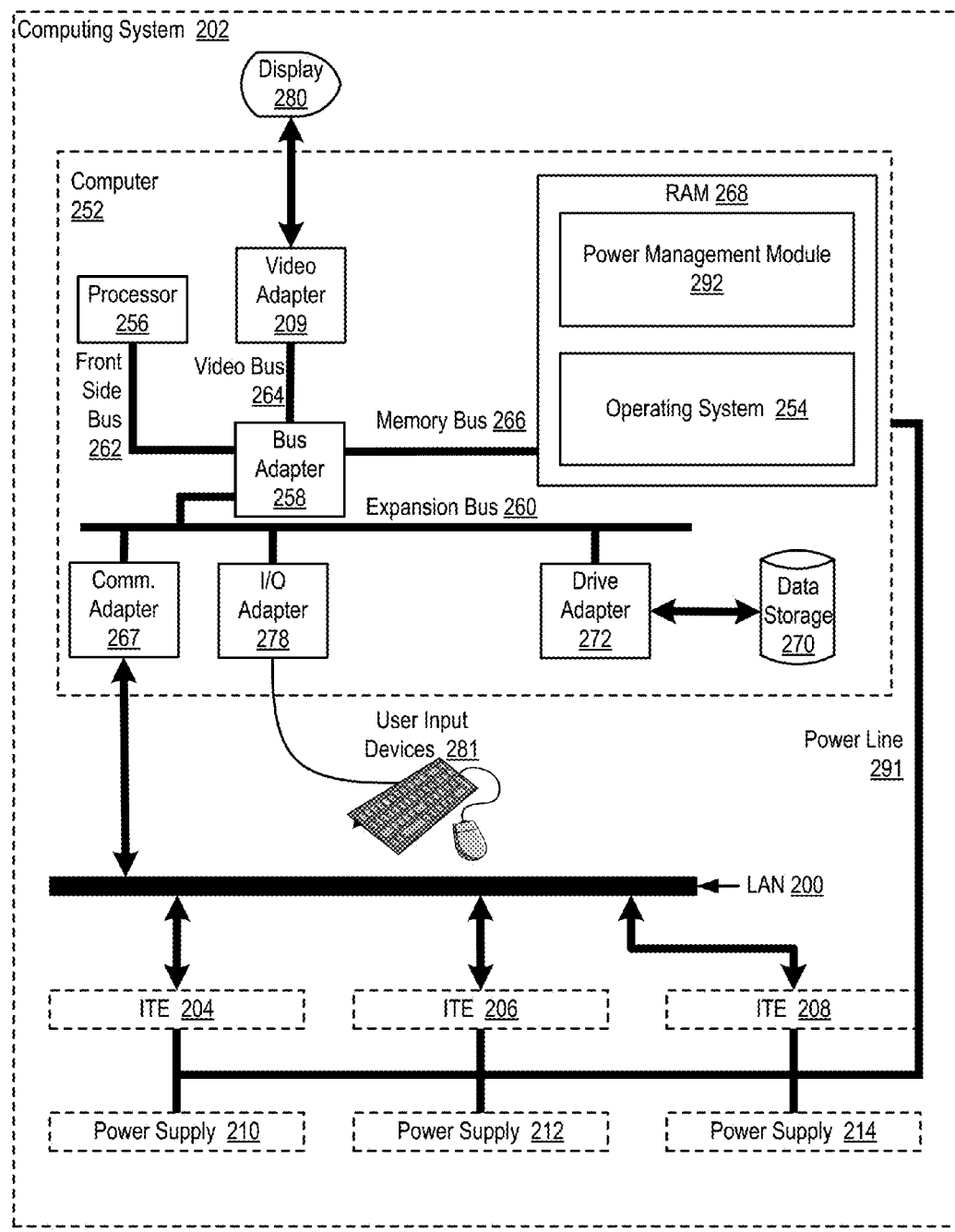
FIG. 2 sets forth a block diagram of automated computing machinery comprising an example computer useful in preventing oversubscription to power resources in a computing system according to embodiments of the present invention.

For further explanation, FIG. 2 sets forth a block diagram of automated computing machinery comprising an example computer (252) useful in preventing oversubscription to power resources in a computing system (202) according to embodiments of the present invention. The computing system (202) of FIG. 2 may be embodied, for example, as a blade server system that includes a plurality of ITEs and a plurality of power supplies (210, 212, 214). Each ITE (204, 206, 208) may be embodied, for example, as a blade server, a blower, a network switch, a storage device, or any other power consuming component mounted within the computing system (202).

The computer (252) of FIG. 2 includes at least one computer processor (256) or 'CPU' as well as random access memory ('RAM') (268) which is connected through a high speed memory bus (266) and bus adapter (258) to processor (256) and to other components of the computer (252). Stored in RAM (268) is a power management module (292), a module of computer program instructions for preventing oversubscription to power resources in a computing system (202) according to embodiments of the present invention.

The power management module (292) may be configured to prevent oversubscription to power resources in a computing system (202) by detecting that power delivery capabilities of the power supplies (210, 212, 214) have changed. The power delivery capabilities of the power supplies (210, 212, 214) may include, for example, the total amount of power that the power supplies (210, 212, 214) are rated to deliver. The power delivery capabilities of the power supplies (210, 212, 214) may change, for example, when one or more power supplies (210, 212, 214) fail, when one or more power supplies (210, 212, 214) recover from a failed state, when additional power supplies are added to the computing system (202), and so on.

The power management module (292) may be further configured to prevent oversubscription to power resources in a computing system (202) by determining, in dependence upon a power redundancy policy and the power delivery capabilities of the power supplies (210, 212, 214), power settings for the plurality of ITEs (204, 206, 208). The power settings for each ITE (204, 206, 208) represent configuration settings that control whether a particular ITE (204, 206, 208) can operate at full power, configuration settings that control whether a particular ITE (204, 206, 208) must operate in a reduced power mode, configuration settings that control the extent to which a particular ITE (204, 206, 208) must be throttled in a particular reduced power mode, and so on.

In the example depicted in FIG. 2, the power settings for the plurality of ITEs (204, 206, 208) are determined in dependence upon a power redundancy policy. The power redundancy policy represents a predetermined set of rules that identifies the number of power supplies (210, 212, 214) in the computing system (302) that will be utilized as redundant power supplies (210, 212, 214) to protect the computing system (302) in the event that one or more power supplies (210, 212, 214) fail. The power redundancy policy may set forth, for example, an n+1 redundancy policy where only one power supply in the computing system (202) is utilized as a failover power supply. In such an example, the failover power supply can be utilized if a single power supply that is actively delivering power to the ITEs (204, 206, 208) fails, thereby maintaining an identical number of power supplies that are actively delivery power to the one or more ITEs (204, 206, 208) when only a single power supply fails. If more than one power supply fails, however, the number of power supplies that are actively delivering power to the one or more ITEs (204, 206, 208) will be reduced as there are not a sufficient number of failover power supplies to replace the failed power supplies.

In an alternative embodiment, the power redundancy policy may set forth an n+n redundancy policy where the number of power supplies that are actively delivering power to the ITEs (204, 206, 208) is identical to the number of power supplies that are utilized as failover power supplies. In such an example, if more than one power supply fails (e.g., n power supplies fail), the number of power supplies that are actively delivering power to the one or more ITEs (204, 206, 208) will not be impacted as there are a sufficient number of failover power supplies available to replace the failed power supplies.

Determining power settings for the plurality of ITEs (204, 206, 208) in dependence upon the power redundancy policy and the power delivery capabilities of the power supplies (210, 212, 214) may be carried out by identifying the maximum amount of power that may be consumed by each of the ITEs (204, 206, 208), without violating the power redundancy policy, given the new power delivery capabilities of the power supplies (210, 212, 214). Consider an example in which each power supply (210, 212, 214) is rated to deliver 2500 Watts, the total amount of power consumed by the ITEs (204, 206, 208) is 4000 Watts, the power redundancy policy is an n+1 policy, and all power supplies (210, 212, 214) are initially functioning. In such an example, two power supplies (210, 212) may actively deliver power to the ITEs (204, 206, 208) while the third power supply (214) serves as a failover power supply, thereby adhering to the n+1 power redundancy policy and delivering the required 4000 Watts of power to the ITEs (204, 206, 208) without oversubscribing to the two power supplies (210, 212) that are actively delivering power to the ITEs (204, 206, 208).

Assume that in the example described above one of the active power supplies (210) fails, such that the power delivery capabilities of the power supplies (210, 212, 214) have changed. In such an example, the power settings for the plurality of ITEs (204, 206, 208) would need to change such that the total amount of power consumed by the ITEs (204, 206, 208) is no more than 2500 Watts. By reducing the total amount of power consumed by the ITEs (204, 206, 208) to no more than 2500 Watts, one of the functioning power supplies (212) could actively deliver power to the ITEs (204, 206, 208) and the other functioning power supply (214) could serve as a failover power supply. In such a way, the computing system (202) could adhere to the n+1 power redundancy policy while placing a supportable power demand on the functioning power supply (212) that is actively delivering power to the ITEs (204, 206, 208).

The power management module (292) may be further configured to prevent oversubscription to power resources in a computing system (202) by updating power settings for the plurality of ITEs (204, 206, 208). Updating power settings for the plurality of ITEs (204, 206, 208) may be carried out, for example, by the power management module (292) sending a message to each ITE (204, 206, 208) that identifies the maximum amount of power that a particular ITE (204, 206, 208) can be allocated in the event that the particular ITE (204, 206, 208) must be throttled. In such an example, a management module on each particular ITE (204, 206, 208) must store such a value in memory such as a memory register. If the management module on a particular ITE (204, 206, 208) subsequently receives a signal indicating that the ITE (204, 206, 208) should be throttled, the management module on the particular ITE (204, 206, 208) may reconfigure the particular ITE (204, 206, 208) such that the ITE (204, 206, 208) only consumes as much power as is permissible as described in the message sent from the power management module (334) to the ITE (204, 206, 208).

Also stored in RAM (268) of the computer (252) is an operating system (254). Operating systems useful for preventing oversubscription to power resources in a computing system (202) according to embodiments of the present invention include UNIX™, Linux™, Microsoft XP™, AIX™, IBM's i5/OS™, and others as will occur to those of skill in the art. The operating system (254) and the power management module (292) in the example of FIG. 2 are shown in RAM (268), but many components of such software typically are stored in non-volatile memory also, such as, for example, on a disk drive (270).

The computer (252) of FIG. 2 includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers for preventing oversubscription to power resources in a computing system (202) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The example computer (252) of FIG. 2 includes a communications adapter (267) for data communications with other computers such as the ITEs (204, 206, 208) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for preventing oversubscription to power resources in a computing system (202) according to embodiments of the present invention include modems for wired dial-up communications, Ethernet (IEEE 802.3) adapters for wired data communications network communications, and 802.11 adapters for wireless data communications network communications.

Figure 3:
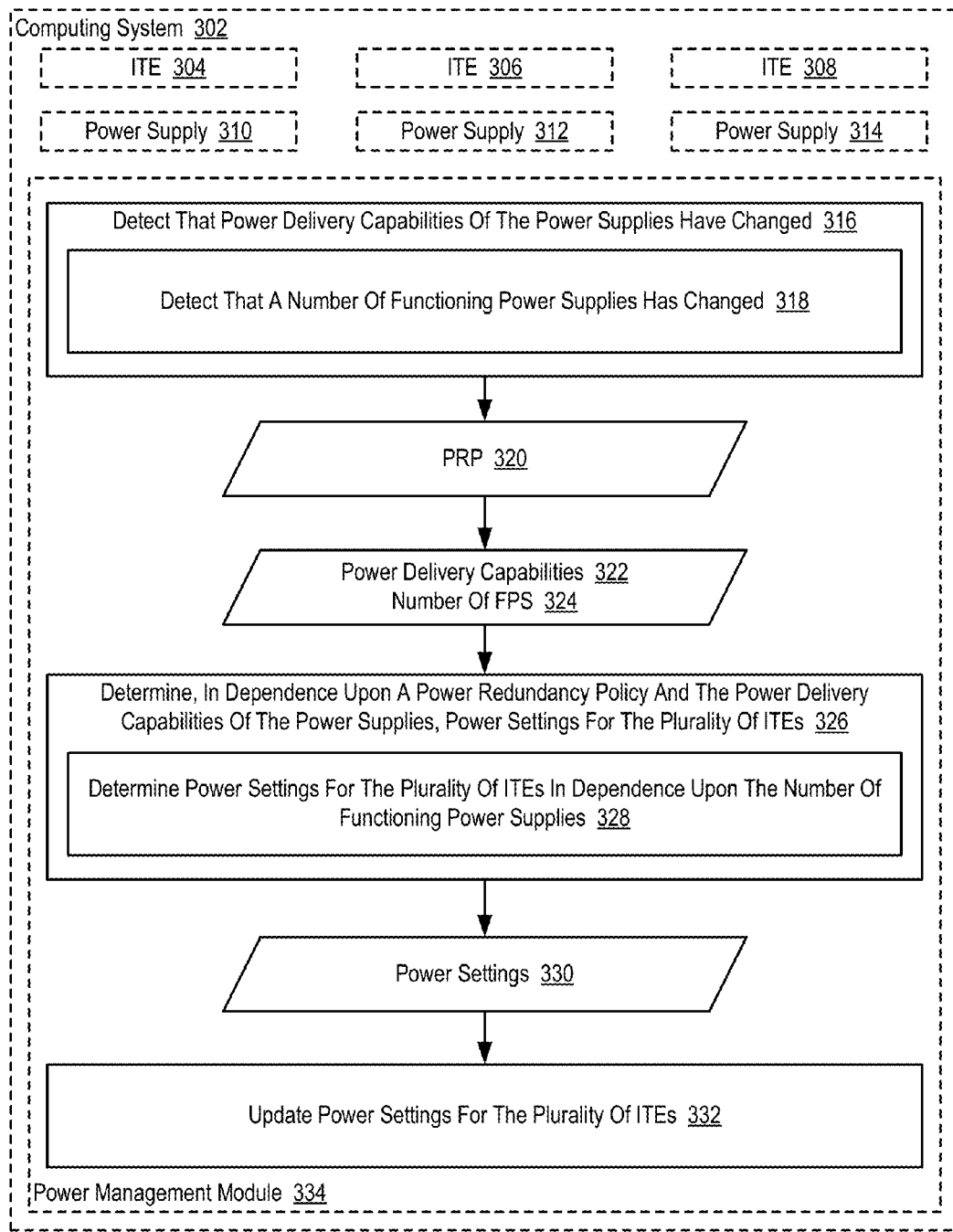
FIG. 3 sets forth a flow chart illustrating an example method for preventing oversubscription to power resources in a computing system according to embodiments of the present invention.

For further explanation, FIG. 3 sets forth a flow chart illustrating an example method for preventing oversubscription to power resources in a computing system (302) according to embodiments of the present invention. The computing system (302) depicted in FIG. 3 includes a plurality of power supplies (310, 312, 314) configured to deliver power to a plurality of ITEs (304, 306, 308). Oversubscription to power resources (e.g., the power supplies (310, 312, 314)) can occur when the cumulative amount of power that the ITEs (304, 306, 308) are attempting to consume exceeds the amount of power that the power supplies (310, 312, 314) are configured to deliver to the ITEs (304, 306, 308). While the ITEs (304, 306, 308) are typically configured to consume no more power than can be provided by the power supplies (310, 312, 314) when each power supply (310, 312, 314) is delivering an amount of power that is less than or equal the power rating for the power supply (310, 312, 314), oversubscription to the power resources in the computing system (302) can occur when one or more of the power supplies (310, 312, 314) fails or otherwise becomes unavailable to deliver power to the ITEs (304, 306, 308).

The example method depicted in FIG. 3 is carried out, at least in part, by a power management module (334). The power management module (334) of FIG. 3 may be embodied, for example, as a module of computer program instructions executing on computer hardware such as a computer processor. The power management module (334) of FIG. 3 may be embodied as a standalone module or may alternatively be included as part of a larger management module such as, for example, a chassis management module as described above with reference to FIG. 1.

The example method depicted in FIG. 3 includes detecting (316), by the power management module (334), that power delivery capabilities (322) of the power supplies (310, 312, 314) have changed. The power delivery capabilities (322) of the power supplies (310, 312, 314) may include, for example, the total amount of power that the power supplies (310, 312, 314) are rated to deliver. The power delivery capabilities (322) of the power supplies (310, 312, 314) may change, for example, when one or more power supplies (310, 312, 314) fail, when one or more power supplies (310, 312, 314) recover from a failed state, when additional power supplies are added to the computing system (302), and so on.

In the example method depicted in FIG. 3, detecting (318) that power delivery capabilities (322) of the power supplies (310, 312, 314) have changed can include detecting (318) that a number (324) of functioning power supplies (310, 312, 314) has changed. Each power supply (310, 312, 314) depicted in FIG. 3 may be in a functioning state or a non-functioning state. A power supply (310, 312, 314) is in a non-functioning state when the power supply (310, 312, 314) has failed and is no longer operating properly. A power supply (310, 312, 314) is in a functioning state when the power supply (310, 312, 314) is functioning properly, regardless of whether the power supply (310, 312, 314) is actively delivering power to one or more of the ITEs (304, 306, 308) or is being utilized as a backup power supply (310, 312, 314) to be utilized if one of the other power supplies (310, 312, 314) fails.

The power management module (334) of FIG. 3 may detect (318) that a number (324) of functioning power supplies (310, 312, 314) has changed by monitoring the operational state of each of the power supplies (310, 312, 314) and actively maintaining information that identifies the number of power supplies (310, 312, 314) that are functioning properly. For example, the power management module (334) may maintain a counter that identifies the number of power supplies (310, 312, 314) that are functioning properly. In such an example, the power management module (334) can decrement the counter when a power supply is removed or otherwise fails, and the power management module (334) can increment the counter when a power supply is added or recovers from a failure. When the power management module (334) changes the value of the counter, the power management module (334) may affirmatively determine that the number of functioning power supplies (310, 312, 314) has changed.

The example method depicted in FIG. 3 also includes determining (326), by the power management module (334) in dependence upon a power redundancy policy (320) and the power delivery capabilities (322) of the power supplies (310, 312, 314), power settings (330) for the plurality of ITEs (304, 306, 308). The power settings (330) for each ITE (304, 306, 308) represent configuration settings that control whether a particular ITE (304, 306, 308) can operate at full power, configuration settings that control whether a particular ITE (304, 306, 308) must operate in a reduced power mode, configuration settings that control the extent to which a particular ITE (304, 306, 308) must be throttled in a particular reduced power mode, configuration settings that identify how much power each ITE (304, 306, 308) is permitted to consume in a reduced power mode, and so on.

In the example method depicted in FIG. 3, the power settings (330) for the plurality of ITEs (304, 306, 308) are determined (326) in dependence upon a power redundancy policy (320). The power redundancy policy (320) of FIG. 3 represents a predetermined set of rules that specifies the extent to which power resources in the computing system will be redundant. The power redundancy policy (320) may specify, for example, how many power supplies in the computing system (302) will be utilized as redundant power supplies and how many power supplies in the computing system (302) will be utilized as active power supplies. A power supply is considered to be an 'active' power supply when the power supply is being utilized to deliver power to the ITEs (304, 306, 308). A power supply is considered to be a 'redundant' power supply when the power supply is not actively delivering power to the ITEs (304, 306, 308), but is functioning properly and available to replace an active power supply in the event that the active power supply fails or otherwise ceases to deliver power to the ITEs (304, 306, 308).

The power redundancy policy (320) may set forth, for example, an n+1 redundancy policy where only one power supply in the computing system (302) is utilized as a redundant power supply and 'n' power supplies are active power supplies, where 'n' can include all of the power supplies in the computing system (302) other than the redundant power supply. In such an example, the redundant power supply can be utilized if one or the active power supplies fails, thereby maintaining an identical number of power supplies that are actively delivery power to the one or more ITEs (304, 306, 308) when only a single power supply fails. If more than one active power supply fails, however, the number of power supplies that are actively delivering power to the one or more ITEs (304, 306, 308) will be reduced as there are not a sufficient number of redundant power supplies to replace the failed power supplies.

In an alternative embodiment, the power redundancy policy (320) may set forth an n+n redundancy policy where the number of redundant power supplies is equal to the number of active power supplies. In such an example, if more than one active power supply fails (e.g., n power supplies fail), the number of power supplies that are actively delivering power to the one or more ITEs (304, 306, 308) will not be impacted as there are a sufficient number of redundant power supplies available to replace the failed active power supplies.

In the example method depicted in FIG. 3, determining (326) power settings (330) for the plurality of ITEs (304, 306, 308) in dependence upon the power redundancy policy (320) and the power delivery capabilities (322) of the power supplies (310, 312, 314) may be carried out by identifying the maximum amount of power that may be consumed by each of the ITEs (304, 306, 308), without violating the power redundancy policy (320), given the new power delivery capabilities (322) of the power supplies (310, 312, 314). Consider an example in which each power supply (310, 312, 314) is rated to deliver 2500 Watts, the total amount of power consumed by the ITEs (304, 306, 308) is 4000 Watts, the power redundancy policy (320) is an n+1 policy, and all power supplies (310, 312, 314) are initially functioning. In such an example, two power supplies (310, 312) may initially deliver power to the ITEs (304, 306, 308) while the third power supply (314) serves as a failover power supply, thereby adhering to the n+1 power redundancy policy (320) and delivering the required 4000 Watts of power to the ITEs (304, 306, 308) without oversubscribing to the two power supplies (310, 312) that are actively delivering power to the ITEs (304, 306, 308).

Assume that in such an example configuration that one of the active power supplies (310) fails, such that the power delivery capabilities (322) of the power supplies (310, 312, 314) have changed. That is, assume that power supply (310) was initially designated as an active power supply and failed, thereby leaving only power supplies (312, 314) to provide power to the ITEs (304, 306, 308). In such an example, the power settings (330) for the plurality of ITEs (304, 306, 308) would need to change such that the total amount of power consumed by the ITEs (304, 306, 308) is no more than 2500 Watts. By reducing the total amount of power consumed by the ITEs (304, 306, 308) to no more than 2500 Watts, one of the functioning power supplies (312) could actively deliver power to the ITEs (304, 306, 308) and the other functioning power supply (314) could serve as a failover power supply. In such a way, the computing system (302) could adhere to the n+1 power redundancy policy (320) while placing a supportable power demand on the functioning power supply (312) that is actively delivering power to the ITEs (304, 306, 308).

In the example method depicted in FIG. 3, determining (326) power settings for each of the plurality of ITEs (304, 306, 308) in dependence upon the power redundancy policy (320) and the power delivery capabilities (322) of the power supplies (310, 312, 314) may include determining (328) power settings for each of the plurality of ITEs (304, 306, 308) in dependence upon the number (324) of functioning power supplies (310, 312, 314). In an example configuration in which all power supplies in the computing system (302)

are identical, the power delivery capabilities (322) may simply be expressed as the number of functioning power supplies in the computing system (302). In such an example, as the number of functioning power supplies increases of decreases, the power delivery capabilities (322) of the power supplies (310, 312, 314) changes. As such, power settings (330) for the plurality of ITEs (304, 306, 308) may be determined (326) such that a sufficient number of functioning power supplies may be designated to actively deliver power to the ITEs (304, 306, 308) and an additional number of power supplies may be designated as failover power supplies such that the power redundancy policy (320) is not violated.

The example method depicted in FIG. 3 also includes updating (332), by the power management module (334), power settings (330) for the plurality of ITEs (304, 306, 308). Updating (332) power settings (330) for the plurality of ITEs (304, 306, 308) may be carried out, for example, by the power management module (334) sending a message to each ITE (304, 306, 308) that identifies the maximum amount of power that a particular ITE (304, 306, 308) can be allocated in the event that the particular ITE (304, 306, 308) must be throttled. In such an example, a management module on each particular ITE (304, 306, 308) must store such a value in memory such as a memory register. In such a way, if the management module on a particular ITE (304, 306, 308) subsequently receives a signal indicating that the ITE (304, 306, 308) should be throttled, the management module on the particular ITE (304, 306, 308) may reconfigure the particular ITE (304, 306, 308) such that the ITE (304, 306, 308) only consumes as much power as described in the message sent from the power management module (334) to the ITE (304, 306, 308).

Figure 4:
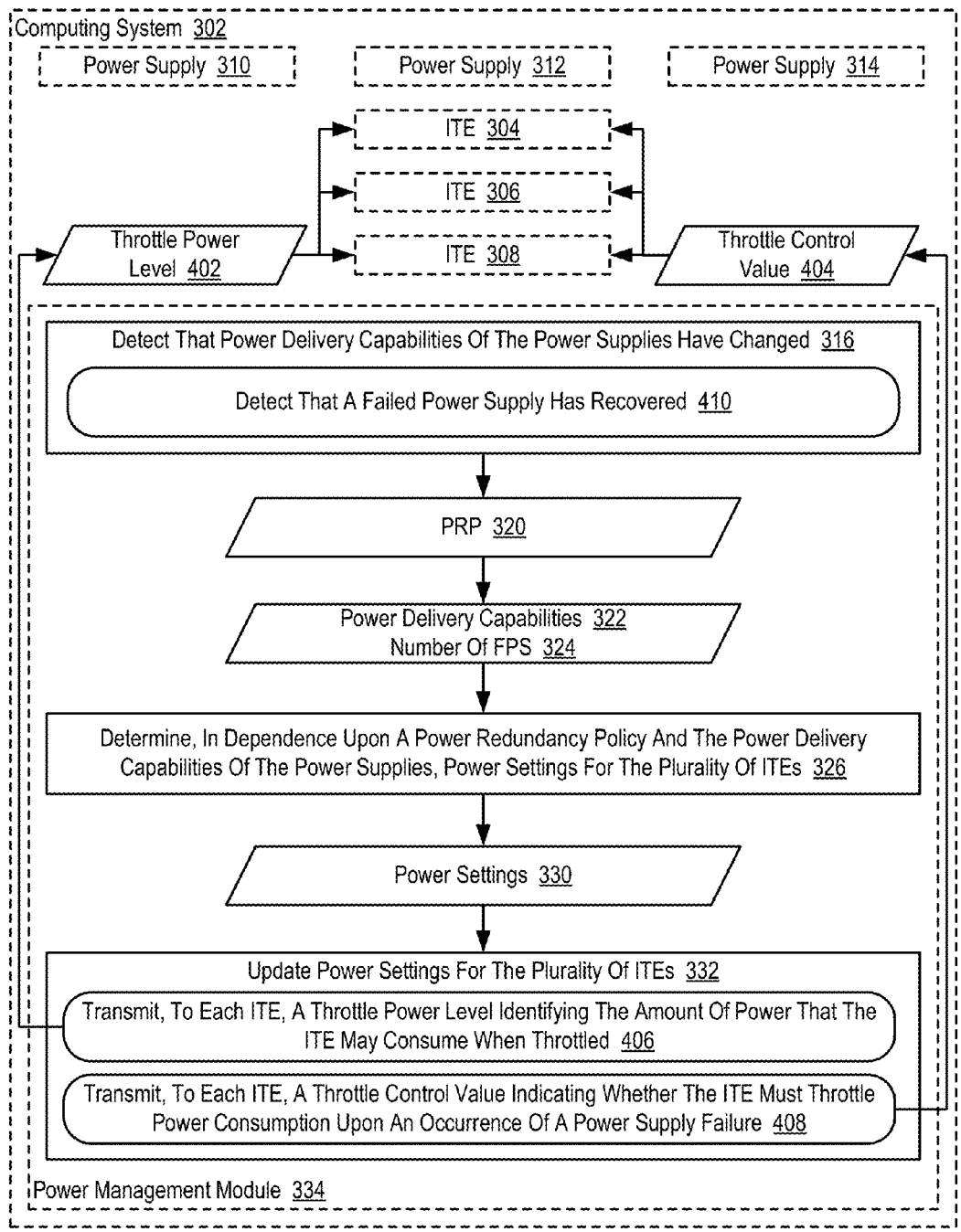
FIG. 4 sets forth a flow chart illustrating an additional example method for preventing oversubscription to power resources in a computing system according to embodiments of the present invention.

For further explanation, FIG. 4 sets forth a flow chart illustrating an additional example method for preventing oversubscription to power resources in a computing system (302) according to embodiments of the present invention. The example method depicted in FIG. 4 is similar to the example method depicted in FIG. 3, as the example method depicted in FIG. 4 also includes detecting (316) that power delivery capabilities (322) of the power supplies (310, 312, 314) have changed, determining (326) power settings (330) for the plurality of ITEs (304, 306, 308) in dependence upon a power redundancy policy (320) and the power delivery capabilities (322) of the power supplies (310, 312, 314), and updating (332) power settings (330) for the plurality of ITEs (304, 306, 308).

In the example method depicted in FIG. 4, updating (332) power settings (330) for the plurality of ITEs (304, 306, 308) can include transmitting (406), to each ITE (304, 306, 308), a throttle power level (402) identifying the amount of power that the ITE (304, 306, 308) may consume when throttled. Each throttle power level (402) depicted in FIG. 4 identifies the amount of power that each ITE (304, 306, 308) may consume when the ITE (304, 306, 308) is placed in a reduced power mode or otherwise throttled. The throttle power level (402) may be expressed in terms of the total amount of power that a particular ITE (304, 306, 308) may consume when the ITE (304, 306, 308) is throttled. Alternatively, the throttle power level (402) may be expressed in terms of the total amount of power that a particular ITE (304, 306, 308) must shed when the ITE (304, 306, 308) is throttled, the throttle power level (402) may be expressed in terms of a percentage of the amount of power that a particular ITE (304, 306, 308) consumes when operating in a full power mode that the ITE (304, 306, 308) must shed when the ITE (304, 306, 308) is throttled, the throttle power level (402) may be expressed in terms of a percentage of the amount of power that a particular ITE (304, 306, 308) consumes when operating in a full power mode that the ITE (304, 306, 308) can consume when the ITE (304, 306, 308) is throttled, and so on.

In the example method depicted in FIG. 4, a throttle power level (402) for each ITE (304, 306, 308) may be transmitted (406) from the power management module (334) to the management module of each ITE (304, 306, 308) as part of a control message exchanged between the power management module (334) and the management module of each ITE (304, 306, 308). The management module of each ITE (304, 306, 308) may subsequently store its throttle power level (402) in a register or other form of memory such that if the management module of a particular ITE (304, 306, 308) receives an instruction to throttle the ITE (304, 306, 308), the management module of the ITE (304, 306, 308) can identify the amount of power consumption that it must shed by inspecting the throttle power level (402).

In the example method depicted in FIG. 4, updating (332) power settings (330) for the plurality of ITEs (304, 306, 308) can alternatively include transmitting (408), to each ITE (304, 306, 308), a throttle control value (404) indicating whether the ITE (304, 306, 308) must throttle power consumption upon an occurrence of a power supply (310, 312, 314) failure. In the example method depicted in FIG. 4, a throttle control value (404) for each ITE (304, 306, 308) may be transmitted (408) from the power management module (334) to the management module of each ITE (304, 306, 308) as part of a control message exchanged between the power management module (334) and the management module of each ITE (304, 306, 308). The management module of each ITE (304, 306, 308) may subsequently store its throttle control value (404) in a register such as an early power off warning ('EPOW') control register or other form of memory that is used in conjunction with other control signals to instruct an ITE (304, 306, 308) to throttle or otherwise enter a reduced power mode.

Consider an example in which a particular computing system includes five power supplies that are each capable of providing 2500 Watts of power, the total maximum power consumption of each ITE in the computing is 6000 Watts, and the computing system utilizes an n+1 power redundancy policy as described above. Three of the five power supplies may therefore originally serve as active power supplies that provide a sufficient amount of power to the ITEs while the remaining two power supplies serve as redundant power supplies. In such an example, the throttle control value for each ITE may originally be set to a value indicating that each ITE does not need to throttle power consumption upon an occurrence of a power supply failure, as there are two redundant power supplies and the n+1 power redundancy policy can be adhered to even if one active power supply fails and is replaced by one of the redundant power supplies.

For the purposes of illustration, assume that one of the five functioning power supplies fails, leaving the computing system with four functioning power supplies. In such an example, the ITEs may continue operating at full power as three of the five power supplies may serve as active power supplies that provide power to the ITEs while the one remaining functional power supply serves as the redundant power supply. The power management module, however, may transmit a throttle control value to each ITE indicating that each ITE does need to throttle power consumption upon an occurrence of an additional power supply failure. The power management module may also transmit a throttle power level to each ITE such that the total amount of power consumed by the ITEs will be reduced to 5000 Watts or less if the ITEs are throttled, such that the ITEs can be powered by only two power supplies, thereby leaving one power supply remaining as a redundant power supply in the event of an additional power supply failure.

For the purposes of illustration, further assume that one of the remaining four functioning power supplies also fails, leaving the computing system with three functioning power supplies. In such an example, the ITEs will be throttled such that the total power consumption of the ITEs is 5000 Watts or less, thereby reducing the total amount of power demanded from the power supplies to a level that is supportable by two of the three functioning power supplies, while the third remaining functional power supply serves as the redundant power supply.

For the purposes of illustration, further assume that one of the two non-functioning power supplies recovers, such that the computing system includes four functioning power supplies. In such an example, the ITEs can be restored to full power mode such that the total power consumption of the ITEs is 6000 Watts. As such, three of the four functioning power supplies may serve as active power supplies that provide power to the ITEs while the fourth remaining functional power supply serves as the redundant power supply. Readers will appreciate that in such a way detecting (316) that power delivery capabilities (322) of the power supplies (310, 312, 314) have changed may therefore include detecting (410) that a failed power supply has recovered.

For the purposes of illustration, further assume that the last non-functioning power supplies also recovers, such that the computing system includes five functioning power supplies. In such an example, the throttle control value for each ITE may be reset to a value indicating that each ITE does not need to throttle power consumption upon an occurrence of a power supply failure, as there are two redundant power supplies and the n+1 power redundancy policy can be adhered to even if one power supply fails.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by computer program instructions on a computing device,
      identifying from among a plurality of power supplies that are configured to deliver power to a plurality of integrated technology elements (ITEs), and in dependence upon a power redundancy policy, a first number of power supplies usable to supply power to the ITEs and a second number of power supplies usable as a redundant power supply to the ITEs;
      detecting that power delivery capabilities of the first number of power supplies of the plurality of power supplies have changed and wherein a second number of functioning power supplies of the second number of power supplies has not changed;
      determining, in dependence upon the power redundancy policy and the changed power delivery capabilities of the first number of power supplies usable to supply power to the ITEs, power settings for the plurality of ITEs by identifying maximum amount of power that can be consumed by each of the ITEs without violating the power redundancy policy; and
      updating, by the power management module, power settings for the plurality of ITEs.

2. The method of claim 1 where the method further comprises:
   determining, in dependence upon the power delivery capabilities of the first number of functioning power supplies of the first number of power supplies and not upon the redundant power supplies of the second number of power supplies, updated power settings for the plurality of ITEs.

3. The method of claim 1 wherein determining power settings for the one or more ITEs further comprises determining power settings for the plurality of ITEs in dependence upon a number of functioning power supplies.

4. The method of claim 1 wherein updating power settings for the plurality of ITEs further comprises transmitting, to each ITE, a throttle power level identifying the amount of power that the ITE may consume when throttled.

5. The method of claim 1 wherein updating power settings for the plurality of ITEs further comprises transmitting, to each ITE, a throttle control value indicating whether the ITE must throttle power consumption upon an occurrence of a power supply failure.

6. The method of claim 1 wherein detecting that power delivery capabilities of the power supplies have changed further comprises detecting that a failed power supply has recovered.

7. The method of claim 1, wherein determining the power settings for the plurality of ITEs further includes, in response to determining the second number of power supplies usable as the redundant power supply to the ITEs violates the redundancy policy, reducing the first number of power supplies usable to supply power to the ITEs.

8. The method of claim 1, wherein determining the power settings for the plurality of ITEs further includes:
   designating a sufficient number of power supplies as usable to supply power to the ITEs; and
   designating an additional number of power supplies as usable as the redundant power supply to the ITEs such that the power redundancy policy is not violated.

9. An apparatus comprising a computer processor and a computer memory operatively coupled to the computer processor, the computer memory having disposed within it computer program instructions that, when executed by the computer processor, cause the apparatus to carry out the steps of:
   identifying from among a plurality of power supplies that are configured to deliver power to a plurality of integrated technology elements (ITEs), and in dependence upon a power redundancy policy, a first number of power supplies usable to supply power to the ITEs and a second number of power supplies usable as a redundant power supply to the ITEs;
   detecting that power delivery capabilities of the first number of power supplies of the plurality of power supplies have changed and wherein a second number of functioning power supplies of the second number of power supplies has not changed;
   determining, in dependence upon the power redundancy policy and the changed power delivery capabilities of the first number of power supplies usable to supply power to the ITEs, power settings for the plurality of ITEs by identifying maximum amount of power that can be consumed by each of the ITEs without violating the power redundancy policy; and
   updating, by the power management module, power settings for the plurality of ITEs.

10. The apparatus of claim 9 wherein detecting that power delivery capabilities of the power supplies have changed further comprises detecting that a number of functioning power supplies has changed.

11. The apparatus of claim 9 wherein determining power settings for the one or more ITEs further comprises determining power settings for the plurality of ITEs in dependence upon a number of functioning power supplies.

12. The apparatus of claim 9 wherein updating power settings for the plurality of ITEs further comprises transmitting, to each ITE, a throttle power level identifying the amount of power that the ITE may consume when throttled.

13. The apparatus of claim 9 wherein updating power settings for the plurality of ITEs further comprises transmitting, to each ITE, a throttle control value indicating whether the ITE must throttle power consumption upon an occurrence of a power supply failure.

14. The apparatus of claim 9 wherein detecting that power delivery capabilities of the power supplies have changed further comprises detecting that a failed power supply has recovered.

15. A computer program product including a non-transitory computer readable medium, the computer program product comprising computer program instructions that, when executed, cause a computer to carry out the steps of:
   identifying from among a plurality of power supplies that are configured to deliver power to a plurality of integrated technology elements (ITEs), and in dependence upon a power redundancy policy, a first number of power supplies usable to supply power to the ITEs and a second number of power supplies usable as a redundant power supply to the ITEs;
   detecting that power delivery capabilities of the first number of power supplies of the plurality of power supplies have changed and wherein a second number of functioning power supplies of the second number of power supplies has not changed;
   determining, in dependence upon the power redundancy policy and the changed power delivery capabilities of the first number of power supplies usable to supply power to the ITEs, power settings for the plurality of ITEs by identifying maximum amount of power that can be consumed by each of the ITEs without violating the power redundancy policy; and
   updating, by the power management module, power settings for the plurality of ITEs.

16. The computer program product of claim 15 wherein detecting that power delivery capabilities of the power supplies have changed further comprises detecting that a number of functioning power supplies has changed.

17. The computer program product of claim 15 wherein determining power settings for the one or more ITEs further comprises determining power settings for the plurality of ITEs in dependence upon a number of functioning power supplies.

18. The computer program product of claim 15 wherein updating power settings for the plurality of ITEs further comprises transmitting, to each ITE, a throttle power level identifying the amount of power that the ITE may consume when throttled.

19. The computer program product of claim 15 wherein updating power settings for the plurality of ITEs further comprises transmitting, to each ITE, a throttle control value indicating whether the ITE must throttle power consumption upon an occurrence of a power supply failure.

20. The computer program product of claim 15 wherein detecting that power delivery capabilities of the power supplies have changed further comprises detecting that a failed power supply has recovered.

* * * * *